Patented Oct. 29, 1940

2,219,839

UNITED STATES PATENT OFFICE 2,219,839

METHOD OF PRODUCTION OF DIETHYLENE-DIAMINE

Stanislaw Grosberg, Lodz, Poland, assignor to Scott & Bowne, Spótka Akcyjna, Towarzystwo Przemystowo-Handlowe dla Wyrobów Chemiczno-Farmaceutycznych, Warsaw, Poland No Drawing. Application August 2, 1939, Serial No. 288,054. In Poland October 22, 1938

1 Claim. (Cl. 260—268)

The methods of production of diethylenediamine used hitherto, show a disadvantage consisting in that by using these methods a relatively great quantity of useless by-products is produced, the efficiency therefore being very low.

The method according to the present invention removes the above disadvantages. Experience has shown that in order to obtain diethylenediamine on industrial scale, ethylenediamine must be treated with ethylene glycol esters, in which one hydroxide is esterified, that means with the following esters

where R denotes acid radical.

The reaction follows the equation

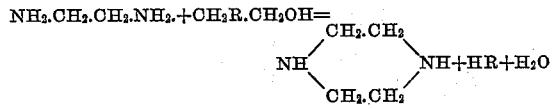

The acid produced in the reaction combines with the obtained diethylenediamine and the water escapes in form of vapor.

As ethylene glycol esters for the above reaction one may use esters of mineral acids as well as esters of organic acids of the formula as above

where R denotes acid radical, especially of acids: sulphuric, phosphoric, chlorhydric, bromhydric, iodhydric, boric, nitric, formic, acetic, lactic, tartaric and citric.

The reaction takes place in the temperatures of 200°–300° C. in acid, neutral or alkaline medium. The reaction lasts about 24 hours.

In view to avoid baking of the reaction mass, it is advantageous to add neutral substances in view to dilute the reaction mass. Sand, bleaching earth, talc, and further dissolvable salts, as sodium chloride, potassium chloride and ammonium chloride may be used as the above neutral substances. As catalysts accelerating the condensation process, zinc chloride, aluminium chloride and ferrous chloride is to be used.

The efficiency obtained renders possible to effect the process on industrial scale.

Example: 1 mol of acetic monoester of ethylene glycol is mixed with 1 mol ethylenediamine and heated up during 24 hours in range 200° till 300° C. From so obtained alloy diethylenediamine is separated by known methods.

What I claim is:

A method for the production of diethylenediamine characterized in that a mixture of ethylene diamine and an ethylene glycol ester of formula $HOCH_2CH_2R$, where R is selected from the group consisting of mineral and organic acid radicals, is melted at a temperature between 200 and 300° C., and to this mixture is added a catalyst from the group consisting of zinc, aluminum and ferrous chlorides, and a substance selected from the group consisting of the insoluble substances, sand, bleaching earth and talc, and the soluble salts, sodium, potassium and ammonium chlorides.

STANISLAW GROSBERG.